United States Patent [19]
Gessler et al.

[11] 3,968,076
[45] July 6, 1976

[54] COVULCANIZATION OF CONJUGATED DIENE-CONTAINING BUTYL WITH HALOBUTYL AND BUTYL RUBBER

[75] Inventors: Albert M. Gessler, Cranford; Francis P. Baldwin, Summit, both of N.J.

[73] Assignee: Exxon Research and Engineering Company, Linden, N.J.

[22] Filed: June 2, 1975

[21] Appl. No.: 582,691

Related U.S. Application Data

[63] Continuation of Ser. No. 393,349, Aug. 31, 1973, abandoned.

[52] U.S. Cl............................ 260/42.35; 260/42.36; 260/42.47; 260/888; 260/890
[51] Int. Cl.² ..................... C08K 3/04; C03L 23/22
[58] Field of Search................. 260/888, 890, 42.36, 260/42.35, 42.47

[56] References Cited
UNITED STATES PATENTS

| | | | |
|---|---|---|---|
| 2,356,128 | 8/1944 | Thomas et al. | 260/888 |
| 2,933,117 | 4/1960 | Baldwin et al. | 260/890 |
| 3,646,166 | 2/1972 | Canter et al. | 260/879 |
| 3,775,387 | 11/1973 | Baldwin | 260/85.3 H |

Primary Examiner—Murray Tillman
Assistant Examiner—J. Ziegler
Attorney, Agent, or Firm—Henry E. Naylor

[57] ABSTRACT

Blends of 5 to 95 wt. % conjugated diene-containing butyl rubber with 95 to 5 wt. % halobutyl or butyl rubber are capable of higher carbon black loading and have faster cure times, unusually high tensile strength and improved green strength. The blends may be cured with dienophilic compounds or sulfur-based cure packages.

10 Claims, No Drawings

COVULCANIZATION OF CONJUGATED DIENE-CONTAINING BUTYL WITH HALOBUTYL AND BUTYL RUBBER

This is a continuation, of application Ser. No. 393,349, filed Aug. 31, 1973, now abandoned.

BACKGROUND OF THE INVENTION

1. Field of the Invention

The present invention relates to the covulcanization of conjugated diene-containing butyl rubber with halobutyl rubber or butyl rubber.

2. Description of the Prior Art

The expression "butyl rubber" is used in the rubber industry to describe copolymers made from a polymerization reaction mixture having therein from 70 to 99.5% by wt. of an isoolefin which has about 4 to 7 carbon atoms, e.g., isobutylene and about 30 to 0.5% by wt. of a conjugated multiolefin having from about 4 to 14 carbon atoms, e.g., isoprene. The resulting copolymers contain 85 to 99.5% by wt. of combined isoolefin and about 0.5 to 15% of combined multiolefin. The preparation of butyl rubber is described in U.S. Pat. No. 2,356,128 which is incorporated herein by reference.

The polymer backbone of commercial butyl rubber is made up primarily of isobutylene units, with just a few percent of isoprene units. The isoprene units contribute the small amount of unsaturation present in butyl rubber. The basic equation is represented by:

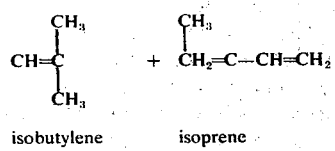

isobutylene     isoprene which combine in the presence of Friedel-Crafts catalysts to form:

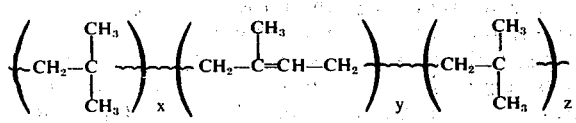

where $x + z$ represent the number of isoolefin units incorporated in the butyl rubber, while $y$ represents the number of initial diolefin units present, substantially as randomly inserted units. The conjugated diolefin, isoprene, loses one olefinic linkage upon its essentially random incorporation into the polymer backbone.

Thus, butyl rubber, as presently produced, contains only a small percentage of unsaturation, in the form of the single double bond associated with the isoprene residue which is incorporated more or less randomly throughout the polymer chain.

It has been discovered that butyl rubber could be produced containing conjugated unsaturation, which is essentially randomly distributed along the linear polymer backbone. The general formula may be represented by:

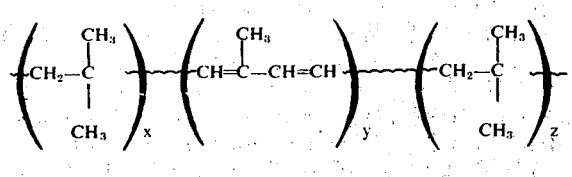

where $x$, $y$ and $z$ have the values previously described, though at least one double bond may lay outside the linear backbone.

This variation may be represented by the formula:

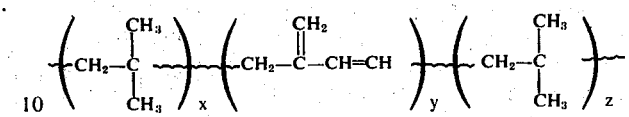

This new butyl rubber has been termed "high reactivity butyl" (HRB) and encompasses the conjugated diene butyl rubber, regardless of where the unsaturation resides in the chain.

The HRB is more completely described in a copending U.S. application Ser. No. 228,727, filed Feb. 23, 1972, now U.S. Pat. No. 3,816,371. One of the preferred methods of preparing this butyl rubber is described in copending U.S. application Ser. No. 228,728, filed by Francis P. Baldwin, one of the present inventors, on Feb. 23, 1972, which issued as U.S. Pat. No. 3,775,387 on Nov. 27, 1973. Both applications are incorporated herein by reference.

One of the present inventors, Francis P. Baldwin, has described the covulcanization of blends of from 10 to 90 wt. % conjugated diene butyl rubber with from 90 to 10 wt. % high unsaturation rubber, such as natural rubber, styrene-butadiene rubber (SBR) and the like, in copending U.S. application Ser. No. 228,727, filed Feb. 23, 1972.

Of the many unusual and interesting features of conjugated diene butyl rubber, it has recently been discovered that the rubber develops its maximum tensile strength at higher carbon black concentrations, when compared with regular butyl or halogenated butyl rubbers. This is particularly true with HAF-LS carbon black, where maximum tensile strength of the conjugated diene butyl occurs with 75–80 parts black per 100 parts rubber (phr), as compared with 50–55 phr black with both butyl and chlorinated butyl rubber. In addition, the conjugated diene butyl rubber cures in about one-fifth (1/5) the time necessary to cure butyl or halobutyl rubber, even using relative "mild" cure packages.

SUMMARY OF THE INVENTION

It has now been discovered that the above-described tensile strength and fast cure advantages of conjugated diene butyl rubber can be synergistically achieved in butyl and halobutyl rubber, by blending together from 5 to 80 wt. % conjugated diene-containing butyl rubber, with from 95 to 20 wt. % of butyl or halobutyl rubber. The blend is reinforced with carbon black and cured with sulfur-type cure systems or by use of a dienophilic compound, such as trimethylolpropane trimethacrylate.

The resulting carbon black loaded, but uncured blends have unusually high green strengths, and can be formed into inner tubes. A particularly useful advantage of the blend is its development of a complete cure in a relatively short period of time, at commercially acceptable temperatures.

DESCRIPTION OF THE PREFERRED EMBODIMENTS

It is well known that polymers prepared with different monomers are rarely, if ever, compatible in the physical sense. On the other hand, polymers prepared from predominantly one monomer by a given mode of enchainment and containing only minor structural perturbations arising from copolymerization or chemical modification can be expected to be compatible. Once the barrier of physical incompatibility is removed, one can anticipate full utilization of any possible chemical synergisms arising from the blending together of physically compatible polymers containing minor chemical modifications.

We have found that the blending together of isobutylene based polymers containing conjugated diene groupings with other isobutylene based polymers containing simple olefinic linkages and/or allylically substituted halogen atoms can lead to important consequences, both of a technical and economic nature. Thus, the blending together of minor quantities of conjugated diene-containing butyl rubber with major quantities of regular butyl rubber can lead to faster than anticipated (on an additive basis) cure rate, higher than anticipated modulus and tensile strength, much improved green strength after hot mixing and better than anticipated interaction with carbon black.

The high reactivity butyl rubber, containing the conjugated diene unsaturation, is prepared by dehydrohalogenation of halogenated butyl rubber.

Halogenated butyl rubber has been developed in recent years and has contributed significantly to the elastomer business. A method of preparing halogenated butyl rubber is described in U.S. Pat. No. 3,099,644, which is incorporated herein by reference. Both chlorinated and brominated butyl rubber are typified by:

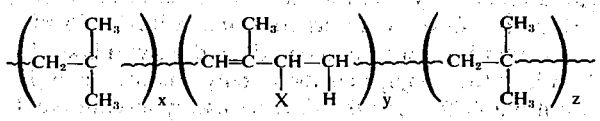

where $x$, $y$ and $z$ have the same values as for butyl rubber, described above, though this structure is but one of several which can be formed, depending on the conditions of halogenation, the halogenating agent used, etc.

Halogenated butyl rubber is commercially available and may be prepared by halogenating butyl rubber in a solution containing 1 to 60% by weight butyl rubber in a substantially inert $C_5$–$C_8$ hydrocarbon solvent such as pentane, hexane, heptane, etc. and contacting this butyl rubber cement with elemental halogen for a period of about 2–25 minutes. There is then formed the halogenated butyl rubber and a hydrogen halide, the copolymer containing up to one or somewhat more, especially in the case of bromine, halogen atom per double bond initially present in the copolymer. This invention is not intended to be limited in any way by the manner in which butyl rubber is halogenated or dehydrohalogenated and both chlorinated and brominated butyl rubber are suitable for use in this invention.

Illustrative of halogenated butyl rubber is Exxon Butyl HT 10–68 (a chlorinated butyl rubber which before halogenation analyses ~1.8 mole % unsaturation and a viscosity-average molecular weight of about 450,000). However, for the purposes of this invention, it is preferred that the butyl rubber starting material have incorporated therein from about 0.5 to 6% of combined diolefin, more preferably 0.5 to 3%, e.g., about 2%.

Conventional high molecular weight butyl rubber generally has a number average molecular weight of about 25,000 to about 500,000 preferably about 80,000 to about 250,000, especially about 100,000 to about 200,000 and a Wijs Iodine No. of about 0.5 to 50, preferably 1 to 15. More recent low molecular weight polymers are prepared to have number average molecular weights of from 5,000 to 25,000 and unsaturation expressed as mole %, of 2–10.

A particularly advantageous method of preparing conjugated diene-containing butyl polymers comprises heating a solution of halogenated butyl rubber in the presence of a soluble metal carboxylate. Suitable metals are the polyvalent metals of Groups Ib, IIb, IVa, and VIII, of the Periodic Table, having a relatively high first ionization potential and whose halides are soluble in the hydrocarbon reaction medium at the reaction temperature. Typical of these are zinc, iron, mercury, nickel, copper, tin and cadmium carboxylates.

Especially useful are the soluble carboxylic acid salts of zinc (e.g., zinc salts of naphthenic acids). While useful in preparing the compositions of the present invention, potential toxicity problems which could be encountered in practicing the present invention might limit the use of certain metals, such as cadmium and mercury salts, for example.

Zinc carboxylate is the most preferred catalyst in the present invention. However, in dehydrohalogenating the halogenated butyl rubber, according to the present invention, zinc chloride is thought to be a by-product in the reaction. Zinc chloride, being an effective Friedel-Crafts type catalyst, may lead to molecular weight degradation or crosslinking of the halogenated polymers, depending on the structure of the polymer, the solvent employed or the reaction conditions.

This difficulty is overcome, in the present invention by having present in the reaction zone a metal oxide, hydroxide or carboxylate whose halogen salt is insoluble in the reaction medium.

It has been found that the mole percent of conjugated diene unsaturation in the dehydrohalogenated butyl, ranges from about 0.5 to about 2.5.

The conjugated diene-containing butyl rubber may be cured by a variety of methods, such as sulfur, sulfur-containing curing agents, polyfunctional dienophiles such as acrylic and methacrylic acid esters, and the like.

It has been found that two disadvantages of butyl rubber in commercial applications, i.e., slow cure rate and poor reinforcement capacity, can be overcome by blending butyl rubber with as little as 5–20 wt. % of the conjugated diene-containing butyl rubber. A synergistic effect permits the maintenance of a high proportion of the reinforcement/curing advantages of conjugated diene butyl in blends containing small amounts of this high reactivity, conjugated diene butyl rubber.

A preferred amount of HRB in the blend, with either butyl or halobutyl rubber, ranges from 5 to 80 wt. %, based on total rubber in the blend. Preferably, the amount of HRB ranges from 10 to 60 wt. %, when a sulfur-based cure system is used in vulcanizing the carbon black loaded rubber blend. If a polyfunctional dienophile is used to vulcanize the blend, the preferred amount of HRB, in the blend, ranges from about 60 to 80 wt. %, or if desired, somewhat higher.

Carbon black fillers are well known in the art. However, a particularly useful reinforcing black is HAF-LS Black. Other standard ingredients are also normally added to the blended rubber compound prior to vulcanization. These ingredients, as well as the carbon black, are used in essentially commercially accceptable amounts. In some applications, however, advantage can be taken of one of the features of the present invention, by use of relatively high loadings of carbon black to achieve high tensile strength compounds. Loadings of up to 70 to 85 phr of black, or higher, are particularly useful for this purpose.

Use of less "potent" accelerators, such as the sulfenamides, are particularly useful in sulfur-type vulcanization of the present blends. However, for some applications, the thiuram/thiazole type accelerators might be usful. Typical of the sulfenamides is Santocure, which is N-cyclohexyl-2-benzothiazole sulfenamide. The more mixed active accelerators may be represented by Altax (benzothiazyl disulfide) and Ethyl Tuads (tetraethylthiuram disulfide).

When the polyfunctional dienophiles are used to vulcanize the blend, cures may be obtained at temperatures ranging from 200° up to 420°F. When using the HRB/halobutyl blends, zinc oxide may or may not be used. Zinc oxide tends to cure halobutyl and use of ZnO would depend on whether the dienophile were needed, by itself, as the vulcanization agent, or whether it would be used as a cure enhancement agent.

The polyfunctional dienophiles such as the acrylic and methacrylic acid esters are well known crosslinking monomers, used in enhancing peroxide crosslinking of ethylene-propylene rubber, and in preparing coatings using free radical initiators, such as high energy radiation, UV, heat, etc. Typical of these are trimethylolpropane trimethacrylate, 1.6-hexane diol diacrylate, 1.3-butylene glycol dimethacrylate, pentaerythritol tetraacrylate, trimethylolpropane triacrylate, polyethylene glycol diacrylate, triethylene glycol dimethacrylate, and diethylene glycol diacrylate. These may be purchased from the Sartomer Company, West Chester, Pennsylvania.

The inventors have only listed a partial sampling of the many polyfunctional dienophiles, and are not thereby limiting their invention to those listed.

The invention will be more completely understood by reference to the following examples:

EXAMPLE 1

In order to demonstrate the preparation of the high reactivity, conjugated diene-containing butyl rubber, the following experiment was conducted.

A one liter glass, vapor jacketed reactor, fitted with stirrer and reflux condenser on reactor and jacket, was charged with 50 grams of a chlorinated butyl rubber (Chlorobutyl HT-1068, manufactured by Exxon Chemical Company, U.S.A.) in 500 cc of xylene, 4 g. zinc naphthenate, 0.5 g naphtenic acid, and 3 g. powdered lime (CaO). The zinc naphthenate, naphthenic acid and CaO were added after the rubber was dissolved. The reactor was then blanketed with nitrogen.

The vapor jacket, also charged with xylene, was then brought to reflux, leading to a reactor temperature of about 135°C. After 0.5, 1, 2 and 4 hours of heating, 75 ml samples were withdrawn from the reactor, placed in centrifuge tubes, diluted with approximately 30 ml of hexane and centrifuged.

The clear fluid in the tubes was then slowly poured into rapidly agitated acetone to precipitate the polymer. The precipitate was then stored for 12 hours under 200 ml acetone containing 0.2 g. of an antioxidant. The polymer was dried in a vacuum oven at about 50°C for 16 hours.

Samples were submitted for chlorine analysis, the results of which are in Table I.

TABLE I

CHLORINE ANALYSIS

| Sample | Reaction Time, Hours | % Cl | % Cl Removed |
|---|---|---|---|
| A | 0 | 1.14 | 0 |
| B | 0.5 | 0.24 | 78.8 |
| C | 1.0 | 0.21 | 81.5 |
| D | 2.0 | 0.14 | 87.6 |
| E | 4.0 | <0.06 | >97 |

The material remaining in the reactor, which was allowed to cool to ambient temperature after 4 hours of heating at 135°C was removed from the reactor and diluted with about 600 ml hexane, the solids settled by gravity and the polymer contained in the clear supernatant fluid precipitated in acetone. The precipitate (designated Sample F) was treated in the same manner as the withdrawn samples in Table 1.

After drying, the sample F was compounded as follows:

| | |
|---|---|
| Polymer Sample F | 100 parts |
| m-phenylene-bis-maleimide | 4.5 |

A sample of this material was placed in a mold in a curing press for 60 minutes at 100°C. On removal of the crosslinked vulcanizate, a sample was immersed in cyclohexane. At equilibrium the sample exhibited a swelling ratio (wt. of sample + wt. of solvent/wt. of sample) of 3.62, indicating a highly crosslinked network.

Drying and reweighing of the swollen sample indicated insolubilization of greater than 96% of the polymer.

EXAMPLES 2-6

Using a conjugated diene-containing butyl rubber, prepared in the manner of Example 1, several compounded blends were prepared with a chlorinated butyl rubber. The halobutyl used was CHLOROBUTYL HT-1068 (as used in Example 1). The conjugated diene butyl contained 0.21% of chlorine; had a dilute solution viscosity (DSV) ratio of 0.866/.747 (.5/1) and a mole % of conjugated diene unsaturation of 1.45.

The blends were each heated in a curing mold at 320°F. for times ranging from 20 minutes up to 160 minutes. Upon completion of the exposure to curing temperatures, the specimens were placed in cyclohexane and swell ratio determined, as in Example 1.

The compound ingredients and the resulting swell ratio are shown in Table II.

TABLE II

DIENOPHILE-CURED RUBBER BLENDS
CONJUGATED DIENE-CONTAINING BUTYL (HRB)/CHLOROBUTYL HT 1068

| EXAMPLE | 2 | 3 | 4 | 5 | 6 |
|---|---|---|---|---|---|
| HRB | 100.0 | 95.0 | 90.0 | 85.0 | 80.0 |
| HT 1068 | | 5.0 | 10.0 | 15.0 | 20.0 |
| SRF Black | | | | 50.0 | |
| Stearic Acid | | | | 2.0 | |
| SR-350[a] | | | | 2.5 | |
| Cure, min. at 320°F. | | Swelling Ratio (Wt. % Solubles)[b] | | | |
| 20 | 6.21 (11.2) | 6.10 (12.5) | 5.90 (12.6) | 6.28 (13.4) | 6.12 (14.8) |
| 40 | 4.17 (5.4) | 4.09 (5.9) | 4.07 (6.0) | 4.21 (7.5) | 4.19 (6.7) |
| 80 | 3.36 (3.4) | 3.30 (3.6) | 3.26 (3.6) | 3.36 (3.9) | 3.38 (4.4) |
| 160 | 2.97 (2.6) | 2.90 (2.8) | 2.91 (2.9) | 2.96 (3.1) | 2.98 (3.2) |

[a] Trimethylolpropane trimethacrylate

[b] Cyclohexane $\frac{\text{Swollen Wt.}}{\text{Dry Wt.}}$ (% Wt. loss after swelling)

EXAMPLES 7-10

A series of experiments were conducted to compare the physical properties of several blends of butyl rubber (Exxon Butyl 268) with the conjugated diene butyl used in Examples 2-6. The basic compound was:

| | Parts |
|---|---|
| Rubber | 100 |
| Stearic Acid | 1.0 |
| Carbon Black (GPF) | 60.0 |
| FLEXON 840 0:1 | 20.0 |
| ZnO | 5.0 |
| Sulfur | 2.0 |
| Ethyl Tuads | 1.0 |
| Altax | 1.0 |

The above compound represents an "inner tube" formulation, and was prepared using a Midget Banbury with the batch size adjusted to yield approximately 260 cc of product (upside down mixing technique with oil added first to the black, 5 minute mixing time.) The compounded blends were vulcanized for varying periods of time at 307°F. The above test samples were vulcanized and tested according to standard ASTM techniques.

The results of these comparisons are found in Table III.

GREEN STRENGTH TEST

The green strength test, used in Examples 7-10, was developed by J. A. Rae, Esso Research and Engineering Company, and is conducted on an Instron testing machine. Using the basic compound formulation above, the rubber is compounded on the Midget Banbury, using a load factor of 1.6. The mixing cycle comprises adding black, ZnO, , oil and polymer in sequence. The ram is then lowered, followed by mixing for 5 minutes. Cooling water is used to control the dump temperature to 270°F (±10°F).

The batch is then added to a cold mill and worked for about 1½ to 2 minutes. The rubber is molded in a Demattia mold to form a notch which is 0.176 inches in diameter. Molding conditions are 10 minutes at 212°F. The molded sample is water quenched and stored overnight at 75°F. The specimens are cut to a ¼ inch by 4 inch size from a 3 × 6 inch pad. Care is taken to avoid air bubbles when cutting specimens.

The Instron testing machine is used with a "C" strain gauge cell which is standardized, immediately before using, with calibrated weights. The chart speed is set at 5 inches per minute and the strain rate at 20 inches per minute. The distance (vertical) between the sample jaws is adjusted to exactly 2 inches. The Instron movable jaw is adjusted so that after 2 inches of travel (100% elongation) it stops automatically. The stress or load is recorded automatically on the moving chart.

TABLE III

BUTYL/HRB RUBBER BLENDS

| EXAMPLE | | 7 | 8 | 9 | 10 |
|---|---|---|---|---|---|
| Butyl, parts | | 100 | 90 | 80 | 60 |
| Conjugated Diene Butyl (HRB), parts | | 0 | 10 | 20 | 40 |
| Green Strength[a], seconds | | | | | |
| 1) No heat treatment | | 12.4 | 13.6 | 16.5 | 18.9 |
| 2) Heat treatment | | 13.1 | 13.7 | 51.9 | 68.7 |
| Cured 15 min. at 307°F. | | | | | |
| Modulus at | 100% | 130 | 160 | 175 | 175 |
| (lbs/in$^2$) | 200% | 290 | 430 | 500 | 580 |
| | 300% | 500 | 825 | 950 | 1125 |
| | 400% | 750 | 1225 | 1405 | 1630 |
| | 500% | 1075 | 1615 | 1805 | 2010 |
| Tensile Strength (lbs/in$^2$) | | 1750 | 1940 | 2045 | 2055 |
| % Elongation | | 685 | 600 | 580 | 515 |
| Shore Hardness | | 50 | 47 | 48 | 47 |
| Cured 45 min. at 307°F. | | | | | |
| Modulus at | 100% | 225 | 265 | 275 | 260 |
| (lbs/in$^2$) | 200% | 535 | 730 | 800 | 840 |
| | 300% | 820 | 1475 | 1355 | 1495 |
| | 400% | 1140 | 1650 | 1845 | — |
| Tensile Strength (lbs/in$^2$) | | 1580 | 1720 | 1920 | 1965 |
| % Elongation | | 525 | 520 | 415 | 390 |
| Shore Hardness | | 55 | 52 | 52 | 50 |

[a] Heat treatment is achieved by holding masterbatch in sample mold for 45 minutes at 307°F.

The time (seconds) for maximum imposed stress to decay 70% is taken as the measure of green strength.

It is readily seen that the inner tube green strength was increased when the conjugated diene-containing butyl rubber was blended with the regular butyl rubber. The increases are relatively small unless the masterbatch is heat treated. Although an exhaustive testing was not carried out on this aspect, the inventors feel that the green strength of an actual commercial tube compound comparable to Example 9 would be somewhere between 16.5 and 52 lbs/in$^2$ with at least a partial heat treatment effect being created by the extrusion and factory mixing operations.

Using the Table III data for 300% modulus, and determining the stress-strain curve, it was found that the blend (10% of Example 8) had a distinct cure rate advantage over the all-butyl compound of Example 8. It was found that in order to achieve essentially equivalent stress-strain values, it was necessary to cure the 100% butyl 3 times longer than the 90% butyl (Example 8).

Moreover the 90% blend (Example 8), in addition to having more "length" and strength than its all-butyl rubber counterpart, is more rubbery, as determined by the method of A. M. Gessler, Rubber Age, 94, 602 (1964). Following the procedure outlined there, it was found that the stress-strain curve of 90% blend was "sigmoidal" in shape.

The use of more than 10% conjugated diene-containing butyl in the blend simply magnifies the differences which are shown in Table III.

What is claimed is:

1. A compositon of matter comprising a curable blend of from 5 to 95 weight percent (wt. %) conjugated diene-containing butyl rubber consisting essentially of a copolymer consisting of from 85 to 99.5% by weight of an isoolefin having from 4 to 7 carbon atoms, combined with 15 to 0.5% by weight of a conjugated diolefin having from 4 to 14 carbon atoms, containing in the linear backbone conjugated diene unsaturation, the copolymer having a number average molecular weight of from about 5,000 to 500,000 and from 95 to 5 wt. % of a rubber selected from the group consisting of butyl or halogenated butyl rubber.

2. The composition of claim 1, wherein there is also present in the curable blend from 50 to 85 parts, per hundred parts rubber, of a carbon black.

3. The composition of claim 2, wherein the carbon black is HAF-LS carbon black.

4. The composition of claim 1, wherein the curable blend contains a sulfur-type vulcanization system.

5. The composition of claim 1, wherein the curable blend contains a polyfunctional dienophilic vulcanization system.

6. The vulcanized compositon of claim 1.

7. The composition of claim 5, wherein the polyfunctional dienophile is selected from a di- or higher acrylic or methacrylic acid ester.

8. The composition of claim 1, wherein there is from 10 to 60 wt. % conjugated diene-containing butyl rubber.

9. The composition of claim 5, wherein there is from 60 to 95 wt. % conjugated diene-containing butyl rubber and from 40 to 5 wt. % halogenated butyl rubber.

10. The composition of claim 9, wherein the halogenated butyl rubber is chlorinated butyl rubber.

* * * * *